(12) United States Patent
Jain et al.

(10) Patent No.: US 12,079,484 B2
(45) Date of Patent: *Sep. 3, 2024

(54) RANDOM READS USING MULTI-PORT MEMORY AND ON-CHIP MEMORY BLOCKS

(71) Applicant: XILINX, INC., San Jose, CA (US)

(72) Inventors: Abhishek Kumar Jain, Ghaziabad (IN); Henri Fraisse, Sunnyvale, CA (US); Dinesh D. Gaitonde, Fremont, CA (US)

(73) Assignee: XILINX, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,117

(22) Filed: Aug. 3, 2023

(65) Prior Publication Data

US 2023/0409204 A1 Dec. 21, 2023

Related U.S. Application Data

(63) Continuation of application No. 17/184,458, filed on Feb. 24, 2021, now Pat. No. 11,720,255.

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0613; G06F 3/0659; G06F 3/0673
See application file for complete search history.

(56) References Cited

U.S. PATENT DOCUMENTS

| | | | |
|---|---|---|---|
| 9,558,265 B1 | 1/2017 | Tacchi et al. | |
| 10,432,639 B1* | 10/2019 | Bebee | G06F 16/90335 |
| 10,572,409 B1 | 2/2020 | Zejda et al. | |
| 2010/0199036 A1 | 8/2010 | Siewert et al. | |
| 2013/0042060 A1 | 2/2013 | Marukame et al. | |
| 2019/0146682 A1* | 5/2019 | Subramanian | G06F 3/0661 |
| | | | 711/103 |
| 2020/0364100 A1 | 11/2020 | Shah et al. | |
| 2020/0409597 A1* | 12/2020 | Ganesh | G06F 3/0659 |

OTHER PUBLICATIONS

Shao, Zhiyuan, et al. "Processing grid-format real-world graphs on DRAM-based FPGA accelerators with application-specific caching mechanisms." ACM Transactions on Reconfigurable Technology and Systems (TRETS) 13.3 (2020): 1-33. (Year: 2020).*

(Continued)

*Primary Examiner* — Nicholas J Simonetti
(74) *Attorney, Agent, or Firm* — Patterson + Sheridan, LLP

(57) ABSTRACT

A method includes receiving a value and an identifier from a first memory and hashing the identifier to produce a memory block identifier. The method also includes routing, based on the memory block identifier, a read request to a memory block of a plurality of memory blocks and updating the value received from the first memory based on a property received from the memory block in response to the read request. The memory further includes storing the updated value in the first memory.

20 Claims, 5 Drawing Sheets

(56) References Cited

OTHER PUBLICATIONS

Gonzalez, Joseph E., et al. "{GraphX}: Graph processing in a distributed dataflow framework." 11th USENIX symposium on operating systems design and implementation (OSDI 14). 2014. (Year: 2014).*

Fowers, Jeremy et al., "A High Memory Bandwidth FPGA Accelerator for Sparse Matrix-Vector Multiplication," Proc. of the 2014 IEEE 22nd Annual International Symposium on Field-Programmable Custom Computing Machines (FCCM), May 11, 2014, 8 pp., IEEE, Piscataway, New Jersey, USA.

Townsend, Kevin R., et al. "A scalable unsegmented multiport memory for FPGA-based systems." International Journal of Reconfigurable Computing 2015 (2015).

Kwan, Bowen PY, et al. "Lossy Multiport Memory." 2018 International Conference on Field-Programmable Technology (FPT). IEEE, 2018.

Laforest, Charles Eric, et al. "Composing multi-ported memories on FPGAs." ACM Transactions on Reconfigurable Technology and Systems (TRETS) 7.3 (2014): 1-23.

Jain, Hardik, et al. "Achieving Multi-Port Memory Performance on Single-Port Memory with Coding Techniques." 2020 3rd International Conference on Information and Computer Technologies (ICICT). IEEE, 2020.

Johguchi, Koh, et al. "A 2-stage-pipelined 16 port SRAM with 590Gbps random access bandwidth and large noise margin." IEICE Electronics Express 4.2 (2007): 21-25.

Jaiyeoba, Wole, and Kevin Skadron. "Graphtinker: A high performance data structure for dynamic graph processing." 2019 IEEE International Parallel and Distributed Processing Symposium (IPDPS). IEEE, 2019. (Year: 2019).

Wang, Jinyan, and Chengfei Zhang. "Analysis and Evaluation of the GAS Model for Distributed Graph Computation." 2017 IEEE 37th International Conference on Distributed Computing Systems Workshops (ICDCSW). IEEE, 2017. (Year: 2017).

* cited by examiner

_RANDOM READS USING MULTI-PORT MEMORY AND ON-CHIP MEMORY BLOCKS_

CROSS REFERENCE TO RELATED APPLICATION

This application is a continuation of U.S. Non-Provisional application Ser. No. 17/184,458, filed on Feb. 24, 2021 of which is incorporated herein by reference in its entirety.

TECHNICAL FIELD

Examples described herein generally relate to memory access control.

BACKGROUND

Certain applications require high random read bandwidth. For example, a gather-apply-scatter (GAS) model may require high random read bandwidth during the scatter step to update the edge weights of the graph. In the scatter step, the weight of every edge in the graph is updated by performing an algebraic operation on the current edge weight and a property of the source vertex of the edge. Graph edges are typically stored as an adjacency matrix and vertices are typically stored as a map, with the vertex ID as a key and the vertex property as a value. Vertex properties could also be stored as an array or vector.

SUMMARY

According to an embodiment, a method includes receiving a value and an identifier from a first memory and hashing the identifier to produce a memory block identifier. The method also includes routing, based on the memory block identifier, a read request to a memory block of a plurality of memory blocks and updating the value received from the first memory based on a property received from the memory block in response to the read request. The memory further includes storing the updated value in the first memory. Other embodiments include an apparatus or system for performing the method.

BRIEF DESCRIPTION OF THE DRAWING

So that the above recited features of the present disclosure can be understood in detail, a more particular description of the disclosure, briefly summarized above, may be had by reference to examples herein, some of which are illustrated in the appended drawings. However, it is to be noted that the appended drawings illustrate only examples and are therefore not to be considered limiting of the disclosure's scope. Accordingly, the appending drawings admit to other equally effective examples.

In order to facilitate understanding, identical reference numerals have been used, where possible, to designate identical elements that are common features. It is contemplated that elements and features of one example may be beneficially incorporated into other examples without further recitation.

DETAILED DESCRIPTION

Figure 1:
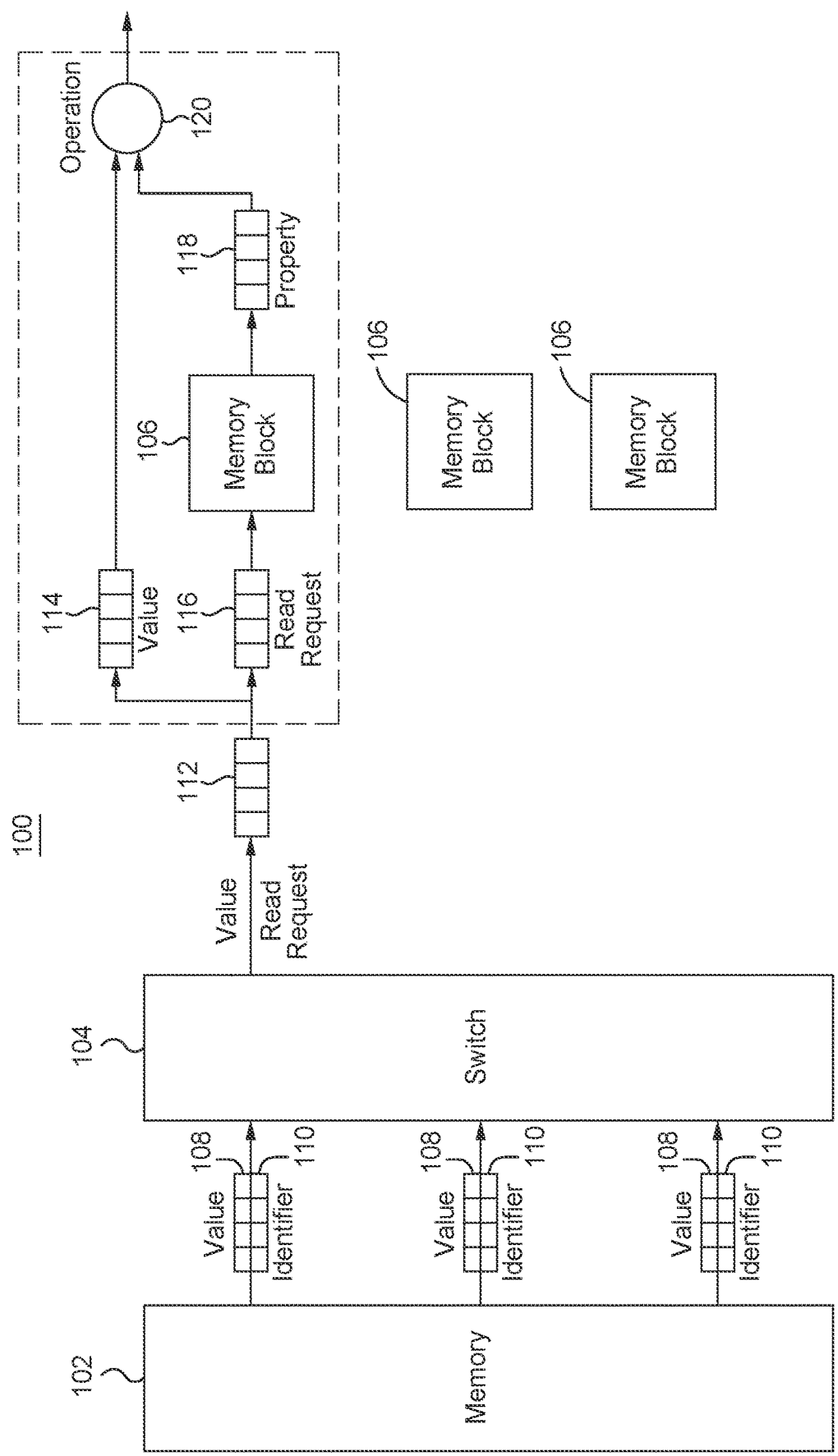
FIG. 1 illustrates a system, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

This disclosure describes a system that provides high random read bandwidth in certain embodiments. Generally, the system routes multiple read requests to different memory blocks by hashing source identifiers for the read requests. In the context of updating edge weights during the scatter step of a gather-apply-scatter (GAS) model, the edge weights may be stored in a first memory (e.g., a high bandwidth memory (HBM)) with corresponding source identifiers and the vertex properties may be stored across multiple memory blocks (e.g., unified random access memory (URAM) blocks or static random access memory (SRAM) blocks). The system may process many of these edge weights and source identifiers in parallel to generate read requests. For example, the system may hash the source identifiers to determine which memory block to route a read request for a corresponding edge weight. After routing the read request to the appropriate memory block, the system may update the edge weight with the vertex property returned from the memory block. The system may route many read requests to many memory blocks in parallel and update many edge weights in parallel. The system may use a streaming network to handle conflicts or collisions at the memory blocks. In this manner, the system provides high random read bandwidth in particular embodiments.

FIG. 1 illustrates an example system 100. Generally, FIG. 1 illustrates components that provide high read bandwidth in certain embodiments. As an example, the system 100 may be a field programmable gate array (FPGA), graphics processing unit (GPU), or an integrated circuit (IC). As seen in FIG. 1, the system 100 includes a memory 102, a switch 104, and one or more memory blocks 106. Generally, the switch 104 generates read requests based on information from the memory 102 and routes those read requests to the appropriate memory block 106. The switch 104 may route multiple read requests to different memory blocks 106 in parallel. In this manner, the switch 104 provides for high read bandwidth in particular embodiments.

The memory 102 may be a high bandwidth memory (HBM). The memory 102 may store values and corresponding identifiers. The values and identifiers may be stored as pairs in the memory 102. The memory 102 may communicate the pairs of values and identifiers to the switch 104 via queues 108 and 110. The queues 108 may hold the values and the queues 110 may hold the identifiers. The memory 102 may communicate multiple pairs of values and identifiers to the switch 104 in parallel via separate pairs of queues 108 and 110. The identifiers may be used to identify a memory block 106 that stores a property. The property may then be used to update the value corresponding to the identifier. For example, the values may be edge weights of edges in a graph, the source identifiers may identify source vertices of those edges in the graph, and the property may be vertex properties that are used to update the edge weights (e.g., during the scatter step of a GAS model).

The switch 104 receives one or more value and identifier pairs from the memory 102 via the queues 108 and 110. The switch 104 may receive these value and identifier pairs in parallel from the memory 102. The switch 104 may then process these value and identifier pairs to generate one or more read requests. The switch 104 may then communicate these read requests to different memory blocks 106 in parallel via queues 112 (e.g., one queue 112 per memory block 106). In certain embodiments, the switch 104 may determine to which memory block 106 a read request should be communicated by hashing the identifier. For example, the switch 104 may perform a modulus operation on the identifier based on the number of memory blocks 106 in the system 100. The switch 104 may communicate read requests to the memory blocks 106 based on the hash of the corresponding identifiers. The switch 104 may communicate these read requests in parallel, which allows high-read bandwidth in certain embodiments.

The memory blocks 106 store properties that can be used to update the values stored in the memory 102. The memory blocks 106 may be separate and distinct from the memory 102 and from each other. The memory 102 may be a different type of memory than the memory blocks 106. In certain embodiments, the memory blocks 106 may be formed using on-chip resources (e.g., URAM or BRAM blocks). As discussed previously, a hashing function may be used to determine which memory block 106 should store the property for a corresponding identifier in the memory 102. The value and read request pair in a queue 112 may be split into separate queues 114 and 116. The read request in the queue 116 may then be communicated to the memory block 106. The memory block 106 responds to the read request by returning a requested property. The property is input into a queue 118. The property in the queue 118 may then be used to update (e.g., through an operation 120) a value in the queue 114 and corresponding to an identifier used to generate the read request. Each memory block 106 may process a read request in parallel with the other memory blocks 106 in the system 100. In this manner, the system 100 allows for multiple values to be updated in parallel.

Figure 2:
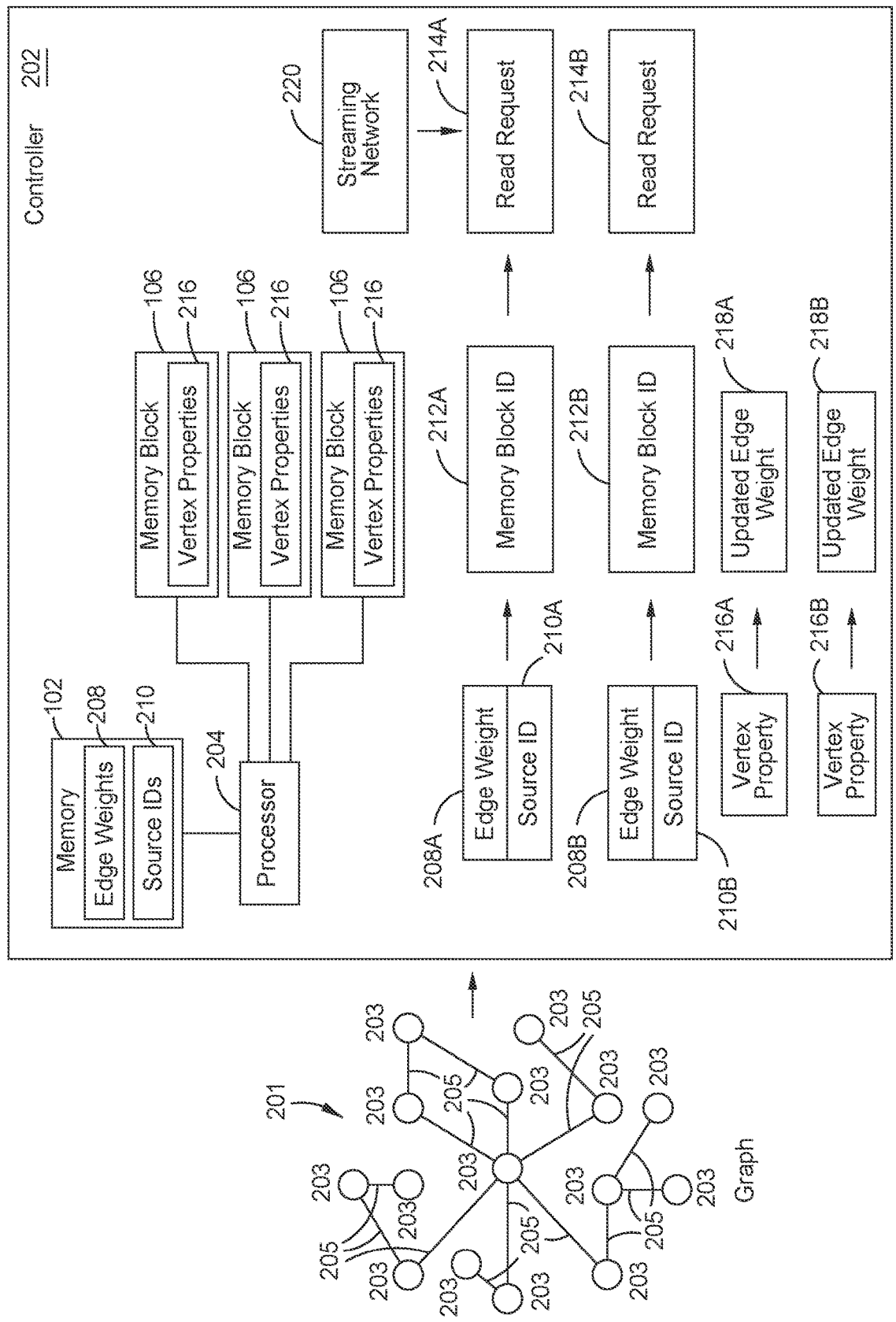
FIG. 2 illustrates a controller, according to an example.

FIG. 2 illustrates an example controller 202. Generally, the controller 202 embodies the components of the system 100 and provide for high read bandwidth in particular embodiments. As an example, the controller 202 may be an FPGA, GPU, other hardware accelerator, or an IC. As seen in FIG. 2, the controller 202 includes a processor 204, the memory 102, and the memory blocks 106, which are configured to perform the functions of the controller 202 or the components of the system 100. For example, the processor 204 may embody the switch 104. The controller 202 may include any number of memory blocks 106.

The processor 204 may be any electronic circuitry, including, but not limited to microprocessors, application specific integrated circuits (ASIC), application specific instruction set processor (ASIP), and/or state machines, that communicatively couples to memory 206 and controls the operation of the controller 202. The processor 204 may be 8-bit, 16-bit, 32-bit, 64-bit or of any other suitable architecture. The processor 204 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 204 may include other hardware that operates software to control and process information. The processor 204 executes software stored on memory to perform any of the functions described herein. The processor 204 controls the operation and administration of the controller 202 by processing information (e.g., information received from the memory 102 or the memory blocks 106). The processor 204 may be a programmable logic device, a microcontroller, a microprocessor, any suitable processing device, or any suitable combination of the preceding. The processor 204 is not limited to a single processing device and may encompass multiple processing devices.

The example of FIG. 2 is provided in the context of updating edge weights in a graph 201 (e.g., during the scatter step of a GAS model). It is understood, however, that the controller 202 may be used in any context where issuing multiple read requests to different memory blocks may be beneficial. As seen in FIG. 2, the graph 201 includes multiple edges 205 connecting different vertices 203. Each edge 205 in the graph 201 may include an edge weight 208. The edge weights 208 may be stored in a high bandwidth memory 102. Each vertex 203 may have different properties 216 that are stored in different memory blocks 106. For example, each memory block 106 may store vertex properties 216 of a subset of the vertices 203 in the graph 201. Additionally, each vertex 203 may be identified by a source identifier (ID) 210 that is stored with the edge weights 208. The controller 202 may receive an edge weight 208 and a source ID 210 (e.g., via queues 108 and 110). The controller 202 may then generate and communicate a read request 214 (via a queue 112 and/or a queue 116) to the appropriate memory block 106 to retrieve the vertex property 216 of a source vertex 203 identified by the source ID 210. The edge weight 208 may then be updated using the vertex property 216. The controller 202 may issue read requests 214 to multiple memory blocks 106 in parallel and update multiple edge weights 208 in parallel. As a result, the controller 202 may reduce the time it takes to update the edge weights 208 in the graph 201.

The controller 202 retrieves edge weight 208 and the source ID 210 pairs from the memory 102 (e.g., a HBM). In the example of FIG. 2, the controller 202 receives a first pair that includes an edge weight 208A and a source ID 210A and a second pair that includes an edge weight 208B and a source ID 210B. The controller 202 may have retrieved the first and second pairs in parallel from the memory 102. Each edge weight 208 may be the weight of an edge 205 in the graph 201. Each source ID 210 may identify a source vertex 203 of that edge 205. Using the example of FIG. 2, the edge weight 208A may be the edge weight for a first edge 205 in the graph 201. The source ID 210A may identify a source vertex 203 of that first edge 205. The edge weight 208B may be the edge weight of a second edge 205 in the graph 201. The source ID 210B may identify a source vertex 203 of that second edge. The controller 202 may retrieve and process the first and second pairs in parallel.

The controller 202 may generate memory block identifiers 212 based on the source identifiers 210. The memory block identifiers 212 may identify a particular memory block 106 to route a read request 214. The controller 202 may generate the memory block identifier 212 in any suitable manner. For example, the controller 202 may hash a source ID 210 to generate a corresponding memory block identifier 212. In certain embodiments, the controller 202 may perform a modulus operation on the source ID 210 based on the number of memory blocks 106 to generate the memory block identifier 212. The memory block identifier 212 may identify a memory block 106 that stores a vertex property 216 corresponding to a particular edge weight 208. In the example of FIG. 2, the controller 202 generates the memory block identifier 212A based on the source ID 210A and the memory block identifier 212B based on the source ID 210B.

The controller 202 then generates read requests 214 based on the memory block identifiers 212. In the example of FIG. 2, the controller 202 generates a read request 214A based on the memory block identifier 212A and a read request 214B based on the memory block identifier 212B. The read requests 214 may include the corresponding memory block identifiers 212 and addresses in their respective memory blocks 106. The controller 202 may communicate the read request 214 to a memory block 106 identified by the corresponding memory block identifier 212. The memory block 106 may use the address information in the read request 214 to retrieve and return a vertex property 216. The controller 202 may communicate the read requests 214 in parallel to the memory blocks 106. The memory blocks 106 may then respond to the read request 214 in parallel, which provides for high-read bandwidth in particular embodiments.

The memory blocks 106 return vertex properties 216 in response to the read request 214. A vertex property 216 may be a property of a source vertex 203 for an edge 205 corresponding to the edge weight 208 and the source ID 210. In the example of FIG. 2, the memory blocks 106 return a vertex property 216A for the read request 214A and the vertex property 216B for the read request 214B. These vertex properties 216 may correspond with source vertices identified by the source ID 210A and the source ID 210B.

The controller 202 then updates the edge weights 208 stored in the memory 102 using the vertex properties 216. In the example of FIG. 2, the controller 202 uses the vertex property 216A to update the edge weight 208A to produce an updated edge weight 218A which is stored in the memory 102. The controller 202 also uses the vertex property 216B to update the edge weight 208B to produce an updated edge weight 218B which is stored in the memory 102. Updating the edge weights 208 in the memory 102 effectively updates the graph 201. In this manner, the controller 202 updates multiple edge weights 208 in the graph 201 in parallel.

In particular embodiments, the controller 202 uses a streaming network 220 to manage conflicts when issuing read requests 214 to the memory blocks 106. For example, if the controller 202 determines that the memory block identifier 212A and the memory block identifier 212B identify the same memory block 106, then the controller 202 may use the streaming network 220 to route the resulting read requests 214A and 214B in a particular order so as to avoid a conflict at the memory block 106. For example, the streaming network 220 may delay or buffer one of the read requests 214 so that the two read requests 214 are not communicated to the same memory block 106 at the same time. Examples of streaming networks 220 and their operation are provided with respect to FIGS. 4 and 5.

Figure 3:
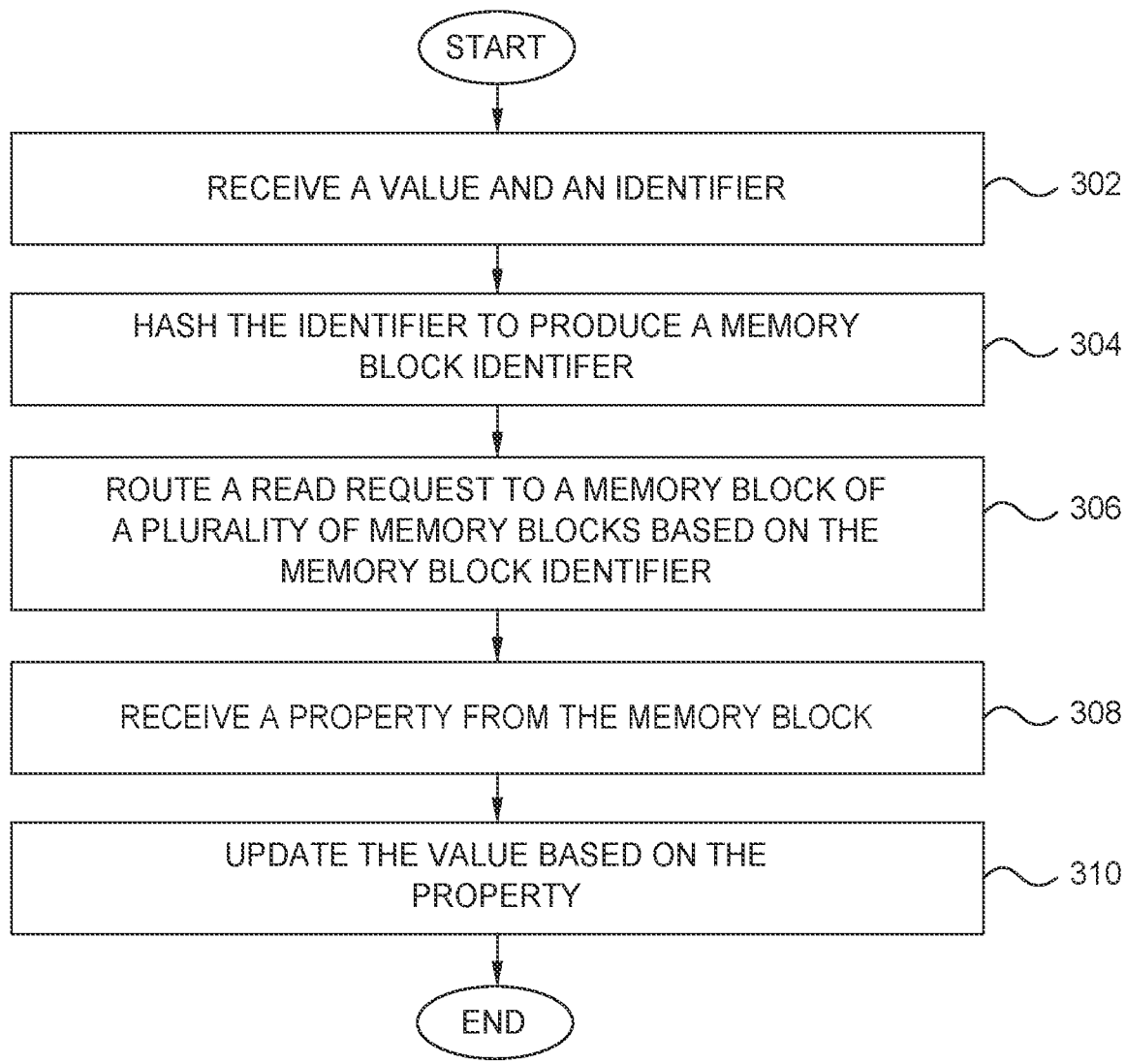
FIG. 3 is a flowchart of a method, according to an example.

FIG. 3 is a flowchart of an example method 300. The controller 202 may perform the method 300. In particular embodiments, by performing the method 300 the controller 202 provides high read bandwidth across multiple memory blocks 106.

In block 302, the controller 202 receives a value (e.g., an edge weight 218) and an identifier (e.g., a source ID 210).

The controller 202 may receive the value and the identifier from the memory 102. The memory 102 may be a HBM that stores and communicates information in parallel. The value and the identifier may be stored as a pair in the memory 102.

In block 304, the controller 202 hashes the identifier to produce a memory block identifier 212. In some embodiments, the controller 202 may perform a modulus operation on the identifier based on the number of memory blocks 106. The memory block identifier 212 identifies a memory block 106 in which a read request corresponding to the value and the identifier should be communicated.

In block 306, the controller 202 routes a read request 214 to a memory block 106 of a plurality of memory blocks 106 based on the memory block identifier 212. For example, the memory block identifier 212 may identify the memory block 106 to which the read request 214 should be routed. The memory block 106 may store a property (e.g., a vertex property). In response to the read request 214, the memory block 106 may return the property.

In block 308, the controller 202 receives the property from the memory block 106. In block 310, the controller 202 updates the value based on the property. In certain embodiments, the controller 202 may communicate multiple read requests 214 to different memory blocks 106 in parallel. These memory blocks 106 may then return properties in parallel, and the controller 202 may update multiple values using these properties in parallel. In this manner, the controller 202 provides high read bandwidth in particular embodiments.

Figure 4:
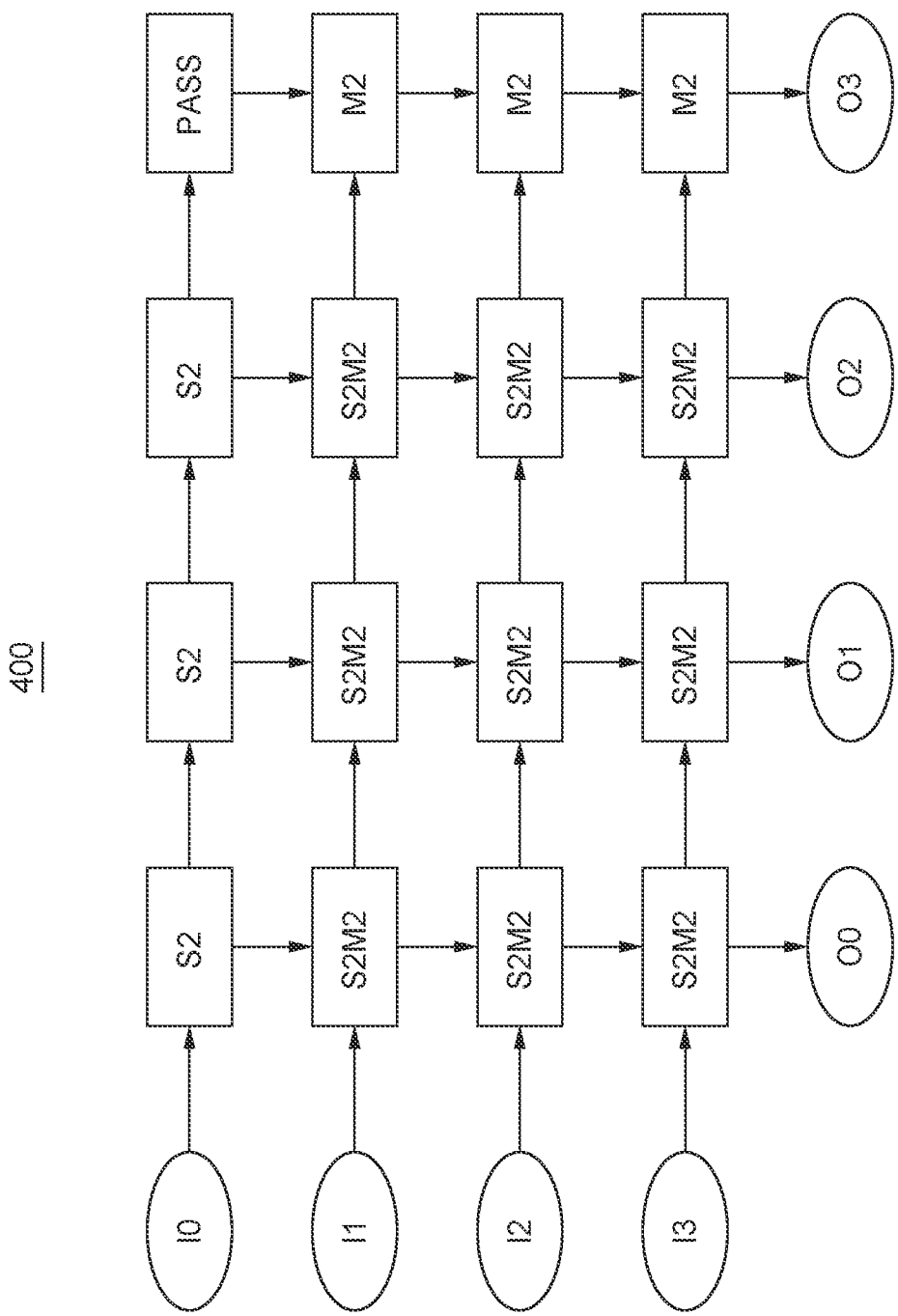
FIG. 4 illustrates a streaming network, according to an example.
Figure 5:
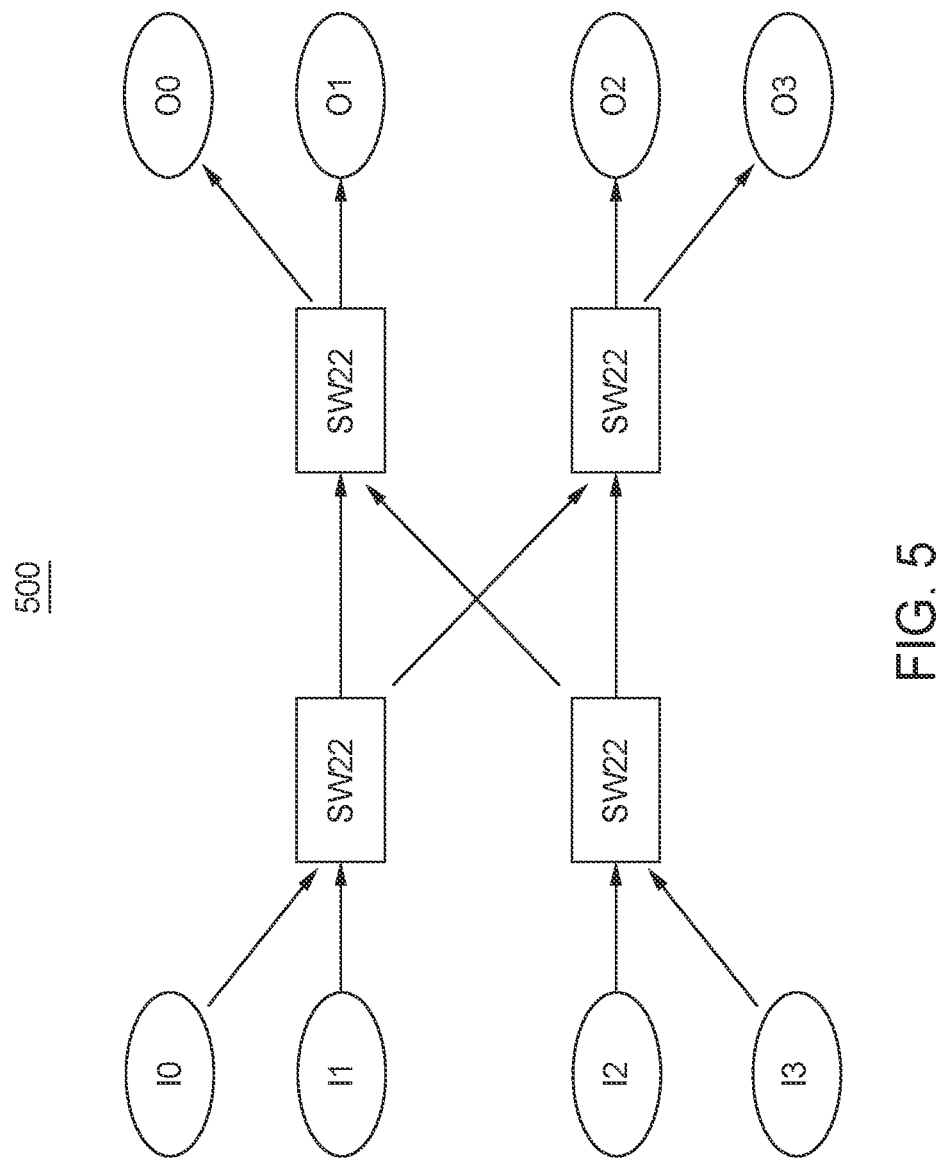
FIG. 5 illustrates a streaming network, according to an example.

FIGS. 4 and 5 illustrate example streaming networks. The controller 202 may use a streaming network to manage conflicts at the memory blocks 106. Generally, the streaming networks buffer or delay certain read requests 214 to avoid a memory block 106 receiving more than one read request 214 at a time.

FIG. 4 illustrates an example streaming network 400. As seen in FIG. 4, the streaming network 400 is a mesh network that routes read requests from four inputs I0, I1, I2, and I3 to four outputs O0, O1, O2, and O3. The streaming network 400 may be expanded to accommodate any number of inputs and outputs.

The inputs I0, I1, I2, and I3 may be parallel ports that receive read requests 214 from the switch 104 or the controller 202. Each port may communicate a read request 214 in parallel with the other ports. When a read request 214 is communicated by a port, the read request passes through a mesh of switches that route the read request 214 to its intended output.

The outputs O0, O1, O2, and O3 are output ports that communicate read requests 214 to different memory blocks 106. For example, each output O0, O1, O2, and O3 may correspond with a different memory block 106. As a result, the streaming network 400 routes read requests 214 from four input ports, I0, I1, I2, and I3 to four memory blocks 106 at output ports O0, O1, O2, and O3. The streaming network 400 may be expanded to include additional output ports corresponding to additional memory blocks 106.

To avoid conflicts at the memory blocks 106, the read requests 214 are routed through the components of the streaming network 400 in a particular manner. First, a read request 214 is routed towards the right side of the streaming network 400 until the read request 214 is in a column corresponding to the intended output port. For example, if a read request from input I0 is intended for output O2, the read request 214 may be routed from I0 towards the right by two switches S2 until the read request 214 reaches the third switch S2. The read request 214 is then in the column of the streaming network 400 corresponding with output O2. The read request is then routed downwards towards the output port O2. Using the previous example, the read request 214 is then routed downwards through three switches S2M2 to the output O2. Using this routing methodology through the streaming network 400 results in different read requests 214 having to traverse a different number of switches S2 or S2M2 depending on the input and output ports used to handle the read requests 214. As a result, fewer conflicts may arise at the memory blocks 106.

Additionally, each switch S2M2 includes a buffer that can buffer read request 214 when more than one read request 214 arrives at the switch S2M2 simultaneously. For example, if on a first cycle, a read request 214 intended for output O0 is issued on input and then on the following cycle, a read request 214 intended for output O0 is issued over input I1, the two read requests 214 may arrive at the switch S2M2 at the intersection of input I1 and output O0 during the same cycle. In this instance, that switch S2M2 may buffer one of the read requests 214 and continue routing the other read request 214 downwards towards output O0. In the following cycle, the switch S2M2 may retrieve the buffered read request 214 and continue routing that read request 214 down towards output O0. In this manner, the streaming network 400 further reduces collisions at the memory block 106 corresponding with the output O0.

In certain embodiments, the streaming network 400 stops accepting issued read requests 214 when a buffer of a switch S2M2 is full. In this manner, the streaming network 400 is given time to route issued read requests 214 and free up space in the buffers before accepting additional read requests 214. As a result, the network 400 avoids running out of buffer space when a collision occurs.

FIG. 5 illustrates an example streaming network 500. As seen in FIG. 5, the network 500 includes inputs I0, I1, I2, and I3 and outputs O0, O1, O2, and O3. The network 500 includes four 2×2 switches SW22 positioned between the inputs and the outputs. The switches SW22 route read requests 214 from the inputs towards the outputs. For example, the two switches SW22 on the left route read requests 214 to the two switches SW22 on the right based on whether the read requests 214 are intended for output O0 or O1 or outputs O2 or O3. The switches SW22 on the right then route the read requests 214 to the appropriate output. For example, if a read request 214 intended for output O3 is issued over input I1, the read request 214 is first routed by the switch SW22 on the top left to the switch SW22 on the bottom right. The switch SW22 on the bottom right then routes the read request 214 to the output O3.

Similar to the network 400, each switch SW22 may include a buffer that holds read requests 214 that arrive at the switch SW22 simultaneously. The switch SW22 may route one of the read requests 214 while buffering the other read request 214. The switch SW22 may then retrieve the read request 214 from the buffer and route that read request 214. In this manner, the network 500 avoids conflicts at the memory blocks 106. Additionally, the network 500 may stop accepting read requests 214 over the inputs when a buffer in the network 500 is full. In this manner, the switches SW22 are provided time to process the read request 214 in the buffers to free up space in the buffers.

In summary, this disclosure describes a switch 104 and a controller 202 that provide high read bandwidth by issuing multiple read requests to different memory blocks in parallel, in particular embodiments. The switch 104 or the controller 202 may hash identifiers received from a HBM to determine the memory blocks that should be accessed. The switch 104 or the controller 202 then generate read requests to access these memory blocks. The memory blocks return properties in response to the read requests. The switch 104 or the controller 202 may update values corresponding to the received identifiers using the properties. The switch 104 and the controller 202 may be useful in applications that benefit from high read bandwidth. For example, the switch 104 and the controller 202 may reduce the time it takes to update edge weights of a graph during the scatter step of a GAS model, in particular embodiments.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method comprising:
receiving a first value and an associated first identifier from a first memory;
hashing the first identifier to produce a memory block identifier for a memory block of a second memory;
routing, based on the memory block identifier, a read request to the memory block of the second memory;
receiving a property from the memory block of the second memory based on the read request;
updating the first value received from the first memory based on the received property; and
storing the updated first value in the first memory.

2. The method of claim 1, wherein the first value is a weight of an edge in a graph and the property is a property of a source vertex of the edge.

3. The method of claim 2, wherein the first identifier identifies the source vertex of the corresponding edge.

4. The method of claim 1, wherein hashing the first identifier comprises performing a modulus operation on the first identifier based on a number of memory blocks in the second memory.

5. The method of claim 1, wherein the first memory is a different type of memory than the second memory.

6. The method of claim 5, wherein the first memory is a high bandwidth memory.

7. The method of claim 1, further comprising buffering a second value in response to hashing a second identifier for the second value producing a second block identifier equal to the memory block identifier.

8. The method of claim 1, further comprising:
receiving a second value and a second identifier from the first memory in parallel with receiving the first value and the first identifier;
routing, based on the second identifier, a second read request to a second memory block of the second memory while routing the read request to the memory block; and
updating the second value based on a second property received from the second memory block while updating the second value.

9. An apparatus comprising:
a first memory;
a second memory comprising a plurality of memory blocks, wherein the second memory is separate from the first memory; and
a hardware processor communicatively coupled to the first and second memories, the hardware processor configured to:
receive a first value and an associated first identifier from the first memory;
hash the first identifier to produce a memory block identifier for selecting a memory block of the second memory;

route, based on the memory block identifier, a read request to the memory block of the second memory;

receive a property from the memory block of the second memory based on the read request;

update the first value received from the first memory based on the received property; and store the updated first value in the first memory.

10. The apparatus of claim 9, wherein the first value is an edge weight for an edge in a graph and the property is a vertex property of a source vertex of the edge.

11. The apparatus of claim 10, wherein the first identifier identifies the source vertex of the corresponding edge.

12. The apparatus of claim 9, wherein hashing the first identifier comprises performing a modulus operation on the first identifier based on a number of memory blocks in the plurality of memory blocks.

13. The apparatus of claim 9, wherein the first memory is a different type of memory than the plurality of memory blocks.

14. The apparatus of claim 9, wherein the first memory is a high bandwidth memory.

15. The apparatus of claim 9, wherein the hardware processor is further configured to buffer a second value in response to hashing a second identifier for the second value producing a second block identifier equal to the memory block identifier.

16. The apparatus of claim 9, wherein the hardware processor is further configured to:

receive a second value and a second identifier from the first memory in parallel with receiving the first value and the first identifier;

route, based on the second identifier, a second read request to a second memory block of the plurality of memory blocks while routing the read request to the second memory block; and update a second value based on a second property received from the second memory block while updating the second value.

17. A system comprising:

a first memory configured to store values and associated identifiers;

a second memory comprising a plurality of memory blocks, wherein the second memory is separate from the first memory; and a hardware processor communicatively coupled to the first and second memories, the hardware processor configured to:

hash a source identifier received from the first memory to produce a memory block identifier for selecting a memory block of the second memory;

route, based on the memory block identifier, a read request to the memory block of the second memory;

receive a property from the memory block of the second memory based on the read request;

update a first value received from the first memory based on the received property; and store the updated first value in the first memory.

18. The system of claim 17, wherein the first value is an edge weight for an edge in a graph and the property is for a source vertex of the edge.

19. The system of claim 18, wherein the source identifier identifies the source vertex of the corresponding edge.

20. The system of claim 17, wherein hashing the source identifier comprises performing a modulus operation on the source identifier based on a number of memory blocks in the plurality of memory blocks.

* * * * *